US008868221B1

(12) United States Patent
Mealy

(10) Patent No.: US 8,868,221 B1
(45) Date of Patent: Oct. 21, 2014

(54) ADAPTIVE NEURAL NET FEED FORWARD SYSTEM AND METHOD FOR ADAPTIVE CONTROL OF MECHANICAL SYSTEMS

(75) Inventor: James Mealy, Corvallis, OR (US)

(73) Assignee: Marvell International Ltd., Hamilton (BM)

( * ) Notice: Subject to any disclaimer, the term of this patent is extended or adjusted under 35 U.S.C. 154(b) by 912 days.

(21) Appl. No.: 12/544,014

(22) Filed: Aug. 19, 2009

Related U.S. Application Data

(60) Provisional application No. 61/091,218, filed on Aug. 22, 2008.

(51) Int. Cl.
| | |
|---|---|
| *G05B 13/00* | (2006.01) |
| *G05B 13/02* | (2006.01) |
| *G05B 13/04* | (2006.01) |
| *G05B 17/00* | (2006.01) |
| *G06F 15/18* | (2006.01) |
| *G06F 19/00* | (2011.01) |
| *G06N 3/02* | (2006.01) |
| *G06N 3/04* | (2006.01) |
| *G06N 99/00* | (2010.01) |

(52) U.S. Cl.
CPC .............. *G05B 13/027* (2013.01); *G05B 13/00* (2013.01); *G05B 13/02* (2013.01); *G05B 13/04* (2013.01); *G05B 13/042* (2013.01); *G05B 17/00* (2013.01); *G06N 3/02* (2013.01); *G06N 3/049* (2013.01); *G06N 99/005* (2013.01)
USPC ................. 700/47; 700/28; 700/29; 700/30; 700/31; 700/44; 700/45; 700/48; 700/117; 700/121; 706/12; 706/14; 706/15; 706/16

(58) Field of Classification Search
CPC ...... G05B 13/00; G05B 13/02; G05B 13/027; G05B 13/04; G05B 13/042; G05B 17/00; G06N 3/02; G06N 3/049; G06N 99/005
USPC ......... 700/28, 29, 30, 31, 44, 45, 47, 48, 117, 700/121; 706/12, 14, 15, 16
See application file for complete search history.

(56) References Cited

U.S. PATENT DOCUMENTS

| | | | | |
|---|---|---|---|---|
| 5,043,896 | A * | 8/1991 | Sol .................................. | 701/80 |
| 5,111,531 | A * | 5/1992 | Grayson et al. ................. | 706/23 |
| 5,175,678 | A * | 12/1992 | Frerichs et al. ................. | 700/47 |
| 5,268,834 | A * | 12/1993 | Sanner et al. .................... | 700/31 |
| 5,311,421 | A * | 5/1994 | Nomura et al. .................. | 706/23 |
| 5,353,207 | A * | 10/1994 | Keeler et al. .................... | 700/44 |
| 5,414,619 | A * | 5/1995 | Katayama et al. .............. | 700/31 |
| 5,485,545 | A * | 1/1996 | Kojima et al. ................... | 706/23 |
| 5,740,686 | A * | 4/1998 | Martinetz et al. ............... | 72/8.4 |
| 6,000,827 | A * | 12/1999 | Hosogi et al. ................... | 700/48 |
| 6,825,912 | B2 * | 11/2004 | Park ................................ | 355/27 |
| 8,150,544 | B2 * | 4/2012 | Burvenich et al. ............ | 700/145 |
| 8,185,230 | B2 * | 5/2012 | Miller et al. ................... | 700/121 |
| 2005/0197721 | A1 * | 9/2005 | Chen et al. ...................... | 700/45 |
| 2007/0085505 | A1 * | 4/2007 | Akiyama ........................ | 318/575 |

(Continued)

*Primary Examiner* — Mohammad Ali
*Assistant Examiner* — Jennifer L Norton

(57) ABSTRACT

A feed forward system includes an input device configured to receive a desired response of the mechanical system and a trainable system configured to generate a feed forward signal that drives the mechanical system based on the desired response. The trainable system is trained based on a plurality of measured responses of the mechanical system.

18 Claims, 6 Drawing Sheets

(56) References Cited

U.S. PATENT DOCUMENTS

| | | | |
|---|---|---|---|
| 2010/0100248 A1* | 4/2010 | Minto et al. | 706/23 |
| 2012/0078390 A1* | 3/2012 | Scholte-Wassink | 700/30 |
| 2013/0035914 A1* | 2/2013 | Igarashi et al. | 703/2 |
| 2013/0116814 A1* | 5/2013 | Yang | 700/121 |

* cited by examiner

ADAPTIVE NEURAL NET FEED FORWARD SYSTEM AND METHOD FOR ADAPTIVE CONTROL OF MECHANICAL SYSTEMS

RELATED APPLICATION

The present application claims the benefit under 35 USC 119(e) of U.S. Provisional Application No. 61/091,218, filed on Aug. 22, 2008, the contents of which are incorporated herein by reference in its entirety.

BACKGROUND

1. Technical Field

The present disclosure relates generally to the control of mechanical systems and, more particularly, to the utilization of neural networks that provide enhanced control of mechanical systems.

2. Related Art

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Mechanical systems are typically operated or "driven" by a control signal that applies power to the mechanical system. In systems that implement feedback control, the response of the mechanical system to the control signal is measured and the control signal is correctively adjusted (i.e., compensated) based on a feedback signal representative of the measured response in an attempt to obtain the desired response of the mechanical system. In other words, the control signal is corrected in order to track changes in the actual response of the system and to suppress unmeasured disturbances that arise during operation. As such, the utilization of feedback control generally results in operational periods in which the actual response is not at the desired response (i.e., setpoint). This may lead to unsatisfactory performance particularly in systems having substantial amounts of delay and/or large time constants. Nonetheless, the control of a number of mechanical systems is entirely provided via feedback. Though most mechanical systems require a degree of feedback as a component of the control signal to account for the unforeseen and/or poor behavior of the mechanical system, the majority of the control signal (i.e., the driving signal) may be provided via feed forward control thereby reducing the reliance of the system on feedback control.

Feed forward control allows for the prediction of a control signal necessary to achieve a desired response from a system. Feed forward control enables known disturbances experienced by a system to be measured and accounted for prior to the disturbances affecting the system response. However, the cost of implementing and maintaining feed forward control in a system can be substantial. Feed forward control typically requires the development of a feed forward model that closely models the actual response of a system over a substantially representative subset of input values of an operating range of the system. A given system may comprise many layers of variable elements such as motors, gears, friction, damping, and mass and may operate amidst various environmental conditions that all contribute to and/or influence a composite nature of the system. Thus, the development of a feed forward model for a given system operating in a multi-input space may be computationally complex and may suffer from inaccuracies, thereby negatively impacting the ability to precisely control the operation of the system.

BRIEF SUMMARY

The present invention is defined by the following claims, and nothing in this section should be taken as a limitation on those claims.

By way of introduction, the embodiments below provide a feed forward system, method and computer readable storage medium for controlling a mechanical system. The feed forward system includes an input device configured to receive a desired response of the mechanical system and a trainable system configured to generate a feed forward signal that drives the mechanical system based on the desired response where trainable system is trained based on a plurality of measured responses of the mechanical system.

The feed forward control method for use with the mechanical system includes receiving a desired response of the mechanical system and generating, by a trainable system, a feed forward signal that drives the mechanical system based on the desired response where the trainable system is trained based on a plurality of measured responses of the mechanical system.

The computer readable storage medium that stores a computer program includes instructions for causing a processor to receive a desired response of a mechanical system and generate, by a trainable system, a feed forward signal that drives the mechanical system based on the desired response where the trainable system is trained based on a plurality of measured responses of the mechanical system. Other systems, methods, and features of the invention will be, or will become, apparent to one with skill in the art upon examination of the following figures and detailed description. It is intended that all such additional systems, methods, features and advantages be included within this description, be within the scope of the invention, and be protected by the following claims.

The embodiments will now be described with reference to the attached drawings.

DETAILED DESCRIPTION

Figure 1:
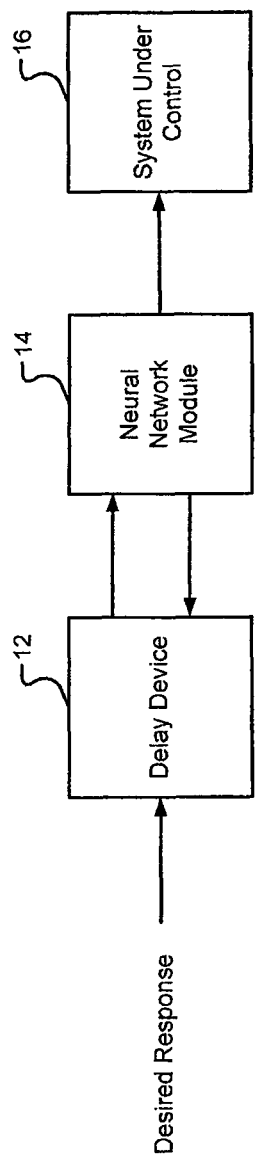
FIG. 1 is a functional block diagram of an exemplary system employing feed forward control system.

The disclosure can be better understood with reference to the following drawings and description. The components in the figures are not necessarily to scale, emphasis instead being placed upon illustrating the principles of the invention. Moreover, in the figures, like referenced numerals designate corresponding parts or elements throughout the different views. The following description is merely exemplary in nature and is in no way intended to limit the disclosure, its application, or uses. As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure.

As discussed in the background, many conventional mechanical systems rely primarily on feedback control. In feedback control, the actual response of the system to a control signal is measured and compared with a desired response of the system. The difference (i.e., the error) between the measured response and the desired response is then fed back into the system to adjust the control signal in order to minimize error and achieve the desired response. Though feedback control enables the control of a mechanical system to account for various unforeseen disturbances (e.g., friction, pressure loss, etc.) as well as the noisy behavior without detailed knowledge of the system, a purely feedback driven mechanical system may be undesirable since feedback control is inherently delayed. In a system purely employing feedback control, a deviation in the operation of the system from the desired response is not recognized until after the deviation has been output by the system. Particularly in complex mechanical systems having substantial internal time lags or delay, the reliance on feedback control may result in severe errors that degrade the operation of the systems.

Feed forward control, as mentioned above, provides for predictive control with regard to the effects of known disturbances on a system. Specifically, feed-forward control enables measurement and compensation of known disturbances before these disturbances affect the inputs of a system and cause a deviation from a desired response (i.e., a setpoint) of the system. However, the implementation of feed forward control requires extremely accurate models of complex systems that may include delay, noise, and/or common non-linear characteristics such as dead zone. Dead zones include ranges of operation in which a system does not respond to a given input until the input reaches a particular threshold. Thus, feed forward control requires substantially accurate models of system operation which are often difficult and costly to develop due to various operational characteristics of a system.

By way of introduction, the embodiments described herein relate to mechanical systems that employ feed forward control in order to provide precise control over the operation of the systems and are merely exemplary in nature. The feed forward control system of the present disclosure generates an ad hoc feed forward model utilizing a trainable system (e.g., a neural network). More particularly, the present disclosure describes a feed forward control system that generates an ad hoc feed forward model by using real-time measured behavior of the controlled system as training data for a trainable system, thereby reducing the reliance of the controlled system on feedback control. Furthermore, the feed forward control system of the present disclosure enables users of the controlled system to efficiently develop an accurate operational model without detailed knowledge of the controlled systems.

Referring now to FIG. 1, an exemplary control system 10 that implements the feed forward control system of the present disclosure is shown. The control system 10 includes a delay device 12, a neural network module 14 (i.e., a trainable system), and a system under control 16. Exemplary control system 10 may include additional components such as additional circuitry, firmware and/or processing modules (not shown). Portions of the control system 10 may be implemented by one or more integrated circuits (ICs) or chips. For example, the delay device 12 and the neural network 14 may be implemented by a single chip. Furthermore, the delay device 12 and the neural network 14 may respectively comprise one or more modules or components. The system under control 16 may comprise a mechanical system such as, but not limited to, a printing system or a robotics system.

Neural networks (i.e., trainable systems) are non-linear statistical data modeling mechanisms utilized to model complex relationships between inputs and outputs of a system. Neural networks may use data points to "learn" about the operation of a system. In other words, a neural network may be "trained" using data indicative of the operation of a particular system. In one implementation, the neural network module 14 ("neural network 14") is trained using various control signals applied to the system under control 16 and the corresponding responses generated by the system under control 16. Although the present disclosure describes the utilization of a neural network 14 within the control system 10, the feed forward control system can be utilized in conjunction with any trainable system that can be trained to emulate a desired output response based on a time-ordered set of input data.

The delay device 12 communicates with the neural network 14. During operation, the delay device 12 receives, as input, a desired response of the system under control 16. The delay device 12 can delay the desired response in order to compensate for signal propagation delays within the system under control 16, as discussed in more detail below. The neural network 14 generates a feed forward signal based on the delayed desired response received from the delay device 12. In one implementation, the feed forward signal is a component of an applied control signal that is applied to the system under control 16. As depicted in FIG. 1, the neural network 14 further communicates with the delay device 12. For example, in one implementation, the neural network 14 can transmit the feed forward signal to the delay device 12 for further processing.

Figure 2:
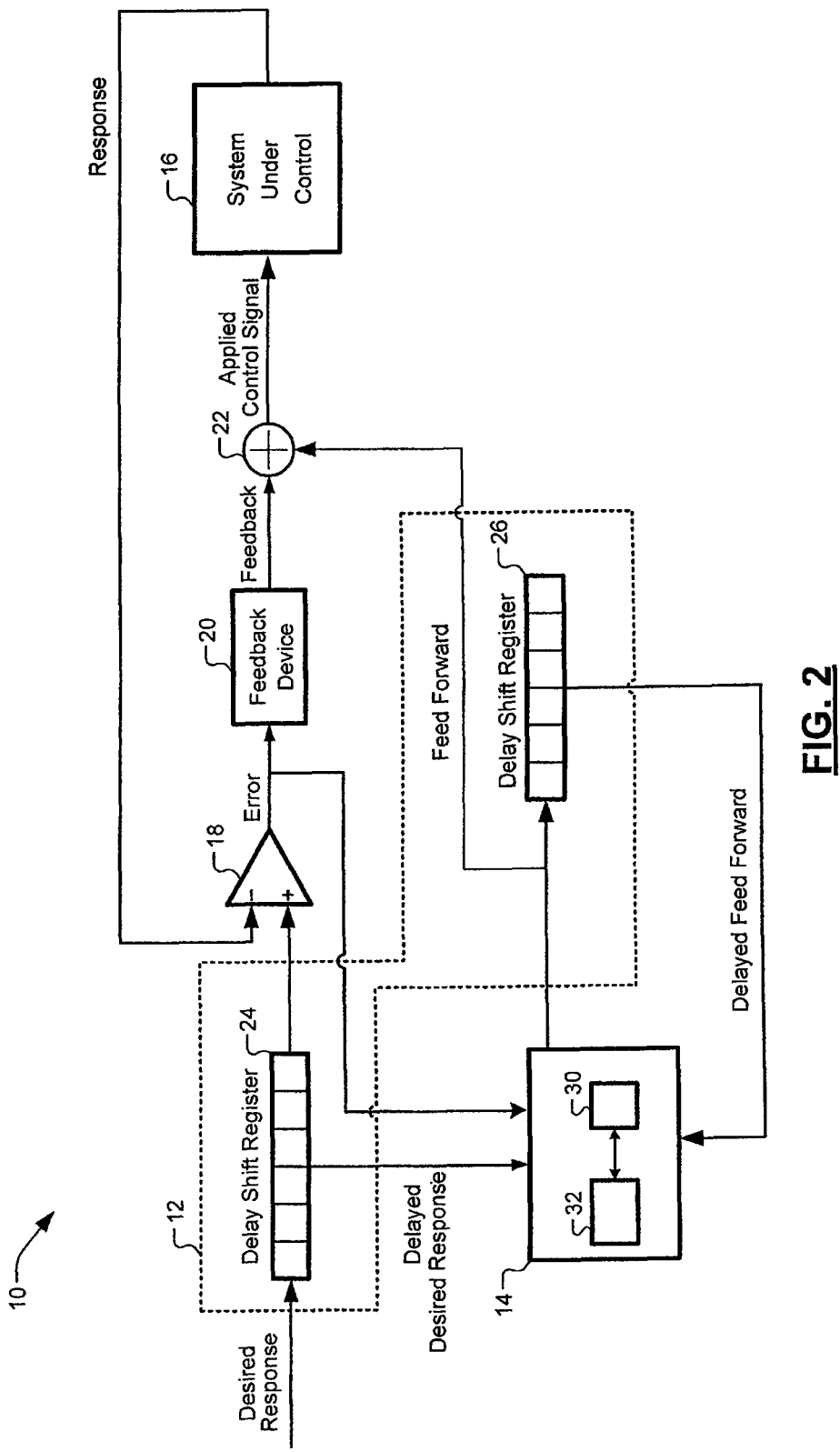
FIG. 2 is a functional block diagram of a first embodiment of the exemplary system employing feed forward control system.

Referring to FIG. 2, an exemplary embodiment of the control system 10 is shown. The control system 10 can implement the feed forward control system of the present disclosure. The control system 10 includes the delay device 12, the neural network 14, the system under control 16, a comparator 18, a feedback device 20, and a summer device 22. In one implementation, the delay device 12 includes one or more delay components, such as a delay shift register 24 and a delay shift register 26.

As mentioned above, the feed forward system generates an ad hoc feed forward model based on training a neural network using real-time measured responses of a controlled system. As such, prior to training the neural network 14, a suite of control signals used to drive the system under control 16 is developed. The suite of control signals drives the system under control 16 over a range of operation representative of the range of operation that the system under control 16 will typically experience. In other words, the system under control 16 may simply be driven over a subset of the range of operation when developing the suite of control signals rather than the over the entire range. In various embodiments, each control signal may comprise a plurality of secondary control signals that control various inputs of the system under control 16. The suite of control signals are applied to the system under control 16, and the associated measured responses (i.e., observed output) of the system under control 16 are obtained.

The respective measured response of the system under control 16 for each control signal of the suite of control signals is used to train the neural network 14. In one implementation, the actual real-time response of the system under control 16 to various control signals is used to train the neural network 14. The neural network 14 comprises a cerebellar model articulation controller (CMAC) having a memory module 30 and a processing module 32, though the present disclosure anticipates various other neural network architectures. The processing module can comprise a microprocessor or a microcontroller. The CMAC is a type of neural network based on a model of the mammalian cerebellum.

The CMAC can be configured to compute a function based on a plurality of inputs (i.e., input dimensions). As described in more detail below, an input space of a CMAC is divided into several partitions, each being associated with a memory cell. The values within the memory cells can represent weights that are adjusted during training of the CMAC. Each point within the input space of the CMAC is typically associated with several partitions. In one implementation, each point within the input space of the CMAC corresponds to several memory cells having respective weights associated therewith. Accordingly, an output of the CMAC may be based on a sum of the weights of the memory cells activated by a particular input received by the CMAC. Each input to the CMAC constitutes a distinct point within the input space of the CMAC. As such, each input respectively activates a distinct set of partitions (i.e., a distinct set of memory cells), thereby generating a unique output.

The neural network 14 (such as the CMAC) is a type of associate memory device in which the memory module 30 is accessed by the processing module 32 using the data (i.e., the contents) stored within the memory module 30, the data being input received by the CMAC. As such, in the present implementation, the suite of control signals is stored within the CMAC based in part on their corresponding measured responses of the system under control 16. In other words, the measured responses and associated control signals are utilized by the CMAC as a training data set. As previously mentioned, the suite control signals are developed by driving the system under control 16 over a subset of the range of operation of the system under control 16. As such, the processing module 32 of the CMAC may utilize a transferring function that enables the CMAC to determine response and control signal pairs for various other operating points within the range of operation of the system under control 16. Therefore the feed forward control system of the present disclosure enables a user to generate an ad-hoc feed forward model that is accurate over a broad operating range of the system under control 16 based on measured, real-time behavior without the need for detailed knowledge of the system under control 16. Accordingly, the feed forward control system provides a feed forward model that does not require time consuming and resource intensive development.

The CMAC can compute a feed forward signal based on a number of inputs (i.e., a number of input dimensions) utilized by the system under control 16. As described above, the input space (not shown) of the CMAC is quantized (i.e., partitioned) into a number of overlapping tables, each of which is associated with a memory cell (not shown) of the memory module 30. The values stored in the memory cells are various weights that are adjusted using the training data set. Typically, more than one quantization of the input space of the CMAC is utilized so that any point within the input space of the CMAC is associated with several overlapping tables. In one implementation, each point (i.e., each combination of inputs utilized to drive the system under control 16) within the input space of the CMAC is associated with a number of memory cells (i.e., weights). The output of the CMAC (i.e., the feed forward signal) can be the sum of the weights of the memory cells activated by a particular input point. Therefore, in the present implementation, each point within the input space of the CMAC results a unique feed forward signal for the system under control 16.

The delay shift register 24 is now described in more detail. Delay shift registers are delay devices which may be programmed for various delay lengths in accordance with a clocking input. Typically, in each clock pulse of a system shifts data in a shift register by one bit. The data is transmitted out after propagating through the delay (i.e., the total number of bits) in the delay shift registers. In one implementation, the taps (i.e., the delays) of delay shift register 24 are programmable. The selection of the number of taps for the delay shift register 24 is based on the transfer function and the delay of the system under control 16. The operation of the delay shift register 24 within the system 10 will be discussed in more detail below.

Upon obtaining the training data set (i.e., a suite of control signals and associated responses) for the system under control 16 and configuring taps of the delay shift register 24, the system under control 16 is subsequently tested with the training data set to determine the optimal CMAC configuration. Several test iterations may be performed prior to establishing the optimal CMAC.

Referring back to FIG. 2, the operation of the control system 10 is described in more detail. A desired response (i.e., a setpoint) of the system under control 16 is applied (i.e., fed) as an input to the delay shift register 24. The delay shift register 24 delays the desired response based on the selected time taps discussed above in order to compensate for delays within the system under control 16. The desired response is presented to the CMAC at distinct time intervals. By delaying the input (i.e., the desired response) to the CMAC, the CMAC receives advance notice (i.e., a "preview") of the upcoming desired response of the system under control 16. This enables the CMAC to adjust feed forward signals in advance in order to substantially match the feed forward signal applied to the system under control 16 to the desired response, thereby reducing the necessity of feedback correction within the control system 10.

The CMAC generates a feed forward signal based on a summation of the respective activated memory cells. The feed forward signal is transmitted to the delay shift register 26 and the summer device 22. The delay shift register 26 subsequently feeds back the output of the CMAC (i.e., the generated feed forward signal) to the CMAC. The availability of the delayed CMAC output enables the CMAC to represent integrated dynamic functions (e.g., accumulated momentum).

As mentioned above, the feed forward signal is also transmitted to the summer device 22. The summer device 22 sums the feed forward signal and a feedback signal received from the feedback device 20 to generate a control signal applied to the system under control 16.

As previously discussed, substantial reliance on feedback control may be undesirable. Not only does feedback control introduce time delay into the control of a system, but feedback may further fail to provide satisfactory system behavior for complex systems having large time constants and/or time delays. Additionally, in feedback control, corrective adjustments to a control signal are not taken until after the output of the system deviates from the desired response. In other words, feedback control may not provide satisfactory predictive control of a system.

In one implementation, a control signal applied to the system under control 16 primarily comprises the feed forward signal received from the CMAC. In this way, the feed forward signal is the dominant component of the control signal used to drive the system under control 16. As such, the feed forward signal constitutes a greater portion of the applied control signal than the feedback signal, thereby reducing the reliance on feedback within the feed forward control system. However, a degree of feedback may be used within the feed forward control system in order to compensate for potential inaccuracies of the feed forward model as well as system noise.

Returning to FIG. 2, the actual response of the system under control 16 is provided to a first input terminal of the comparator 18. The comparator 18 receives the output of the delay shift register 24 (i.e., the desired response) at a second input terminal. In one implementation, the delay provided by the delay shift register 24 is approximated based on the typical operation of the system under control 16. Several delay points are selected for the delay shift register 24 in order to optimize the performance of the CMAC. The CMAC is trained with the training data set, and the performance of the CMAC is evaluated for the selected delay points. This optimization process can be repeatedly performed with various delay points.

The comparator 18 compares the actual response of the system under control 16 to the desired response and generates an error signal indicative of a difference between the actual response and the desired response. The error signal is fed to the feedback device 20. As depicted in FIG. 2, in some embodiments, the error signal may be provided as an error input to the CMAC, thereby enabling the CMAC to be trained with real-time error during the operation of the system under control 16. This is particularly beneficial when the system under control 16 experiences in-use variations of operation.

The feedback device 20 operates to generate the feedback signal to correct the error between the actual response of the system under control 16 and the desired response. In one implementation, the feedback device comprises a proportional-integral-derivative (PID) controller. PID controllers can be configured to determine a first control adjustment value based on the received error signal, determine a second control adjustment value based on a sum of previous errors, and determine a third control adjustment value based on a rate at which the error within a control system has been changing. In one implementation, the PID controller applies weighting factors to each of the three control adjustments and generates a feedback signal based on a sum of the weighted adjustments. As noted above, in the present implementation, the summer device 22 receives the feedback signal generated by the PID controller 20.

Figure 3:
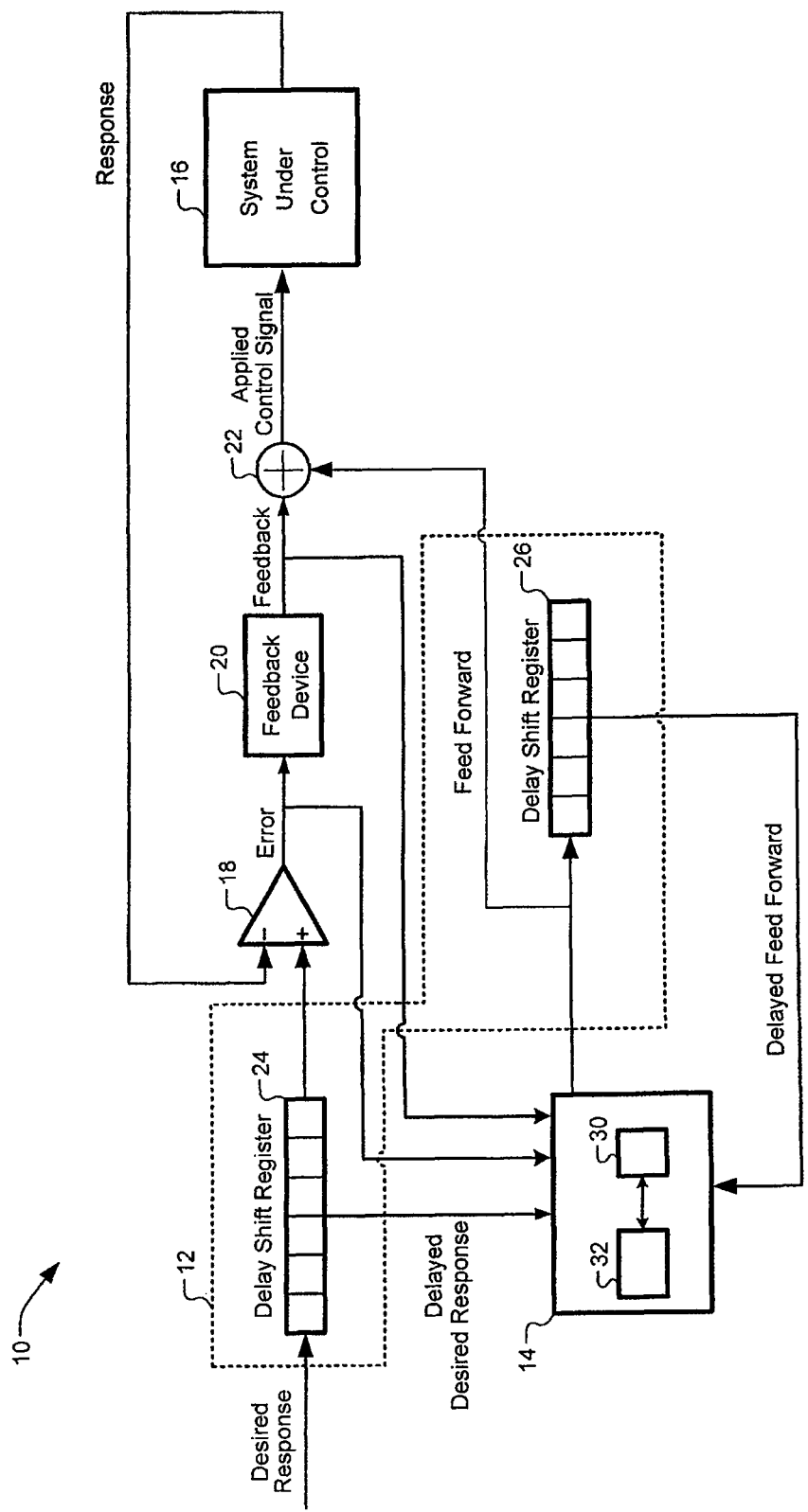
FIG. 3 is a functional block diagram of a second embodiment of the exemplary system employing feed forward control system.

Referring now to FIG. 3, a second exemplary embodiment of the control system 10 is shown. The feedback signal generated by the PID controller is provided as an input to the CMAC. In one implementation, the CMAC actively participates in modifying the feed forward signal based on the real-time behavior of the system under control 16. In various embodiments, the training of the CMAC can be accomplished entirely in real-time. The suite of control signals are applied during operation of the system under control 16 thereby enabling the corresponding actual responses of system under control 16 to be captured in real-time.

Figure 4:
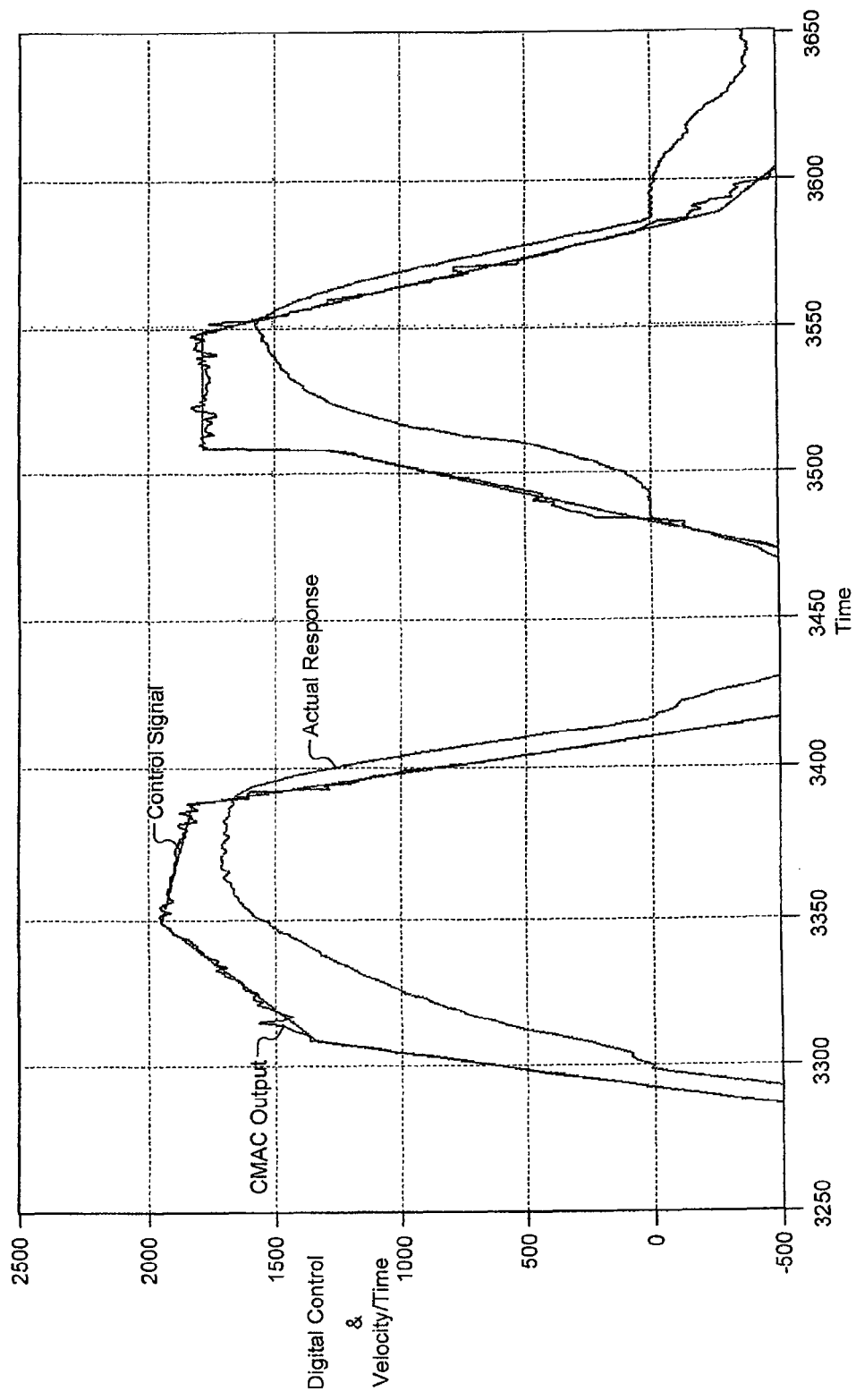
FIG. 4 an exemplary simulation result that depicts the operation of the exemplary feed forward control system.

Referring now to FIG. 4, an exemplary simulation result is shown that depicts the operation of the exemplary feed forward control system according to the present disclosure. Specifically, FIG. 4 illustrates the control signal (i.e., the desired response) applied as input to the control system 10, the output of the CMAC, and the actual response generated by the system under control 16. In the current example, the horizontal axis represents units of time (e.g., milliseconds) and the vertical axis represents digital control values for the control signal and the output of the CMAC and further represents units of velocity per unit time for the actual response of the system under control 16. In one embodiment, each unit of the digital control values may represent 1/2047 the of the maximum power available to drive the system under control 16. Therefore, when the control signal reaches a digital value of 2047, the power driving the system under control 16 is at its maximum.

Figure 5:
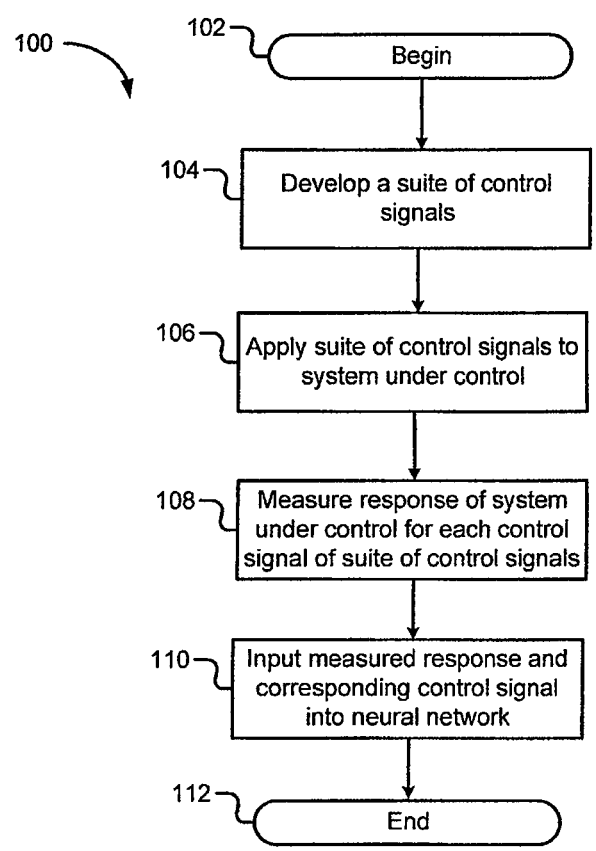
FIG. 5 is a flow diagram illustrating steps of an exemplary training operation for a neural network.

Referring now to FIG. 5, a method 100 of training the neural network 14 is shown in more detail. The method 100 begins at step 102. In step 104, a suite of control signals indicative of a range of operation of the system under control 16 is developed. In step 106, the suite of control signals is applied to the system under control 16. In step 108, the response of the system under control 16 is measured for each control signal of the suite of control signals. In step 110, the measured responses and corresponding control signals are input into the neural network 14 as a training data set. In step 112, the method 100 ends.

Figure 6:
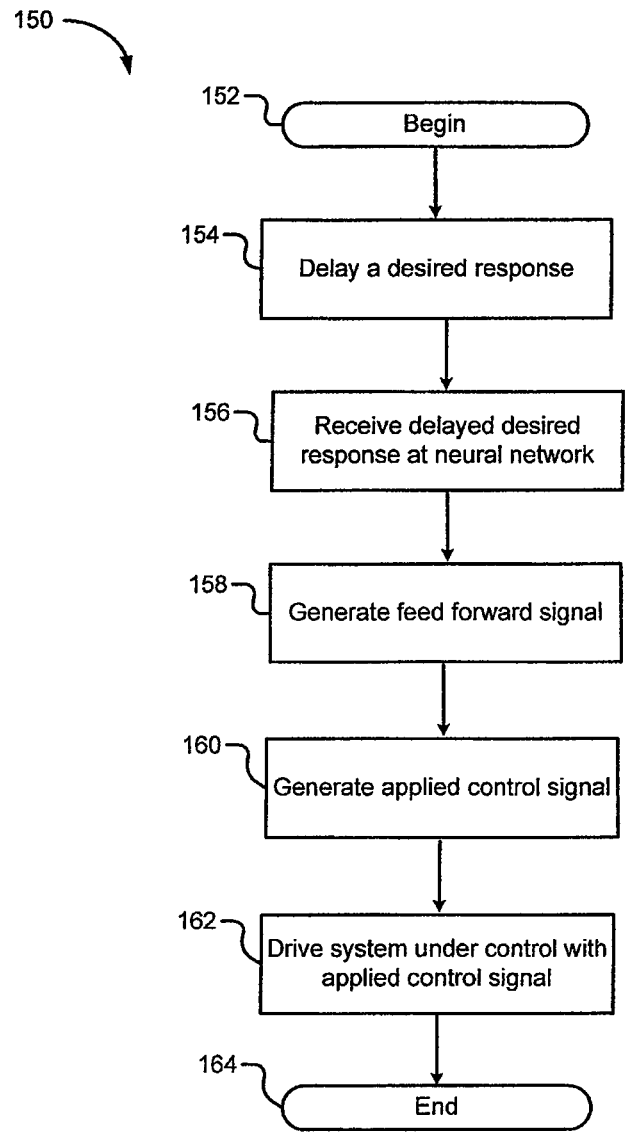
FIG. 6 is a flow diagram illustrating steps of operating the feed forward control system.

Referring to FIG. 6, a method 150 of operating the system under control 16 with the feed forward control system upon start-up is shown in more detail. The method 150 begins at step 152. In step 154, the delay shift register 24 delays a desired response. In step 156, the neural network 14 receives the desired response from the delay shift register 24. In step 158, the neural network 14 generates a feed forward signal based on the delayed output of the delay shift register 24. During continuous operation, the neural network 14 generates the feed forward signal based on the delayed output of the delay shift register 24 and an error signal received from the comparator 18.

In step 160, the summer device 22 generates an applied control signal based on the feed forward signal generated by the neural network 14. During continuous operation, the summer device 22 generates the applied control signal based on the feed forward signal and a feedback signal received from the PID controller. In step 162, the system under control 16 is driven with the applied control signal thereby generating a response from the system under control 16. During continuous operation, the response of the system under control 16 is transmitted to the comparator 18 which generates the error signal mentioned above. In step 164, the method 150 ends.

All of the discussion above, regardless of the particular implementation being described, is exemplary in nature, rather than limiting. Although specific components of the feed forward system are described, methods, systems, and articles of manufacture consistent with the route discovery system may include additional or different components. For example, components of the feed forward system may be implemented by one or more of: control logic, hardware, a microprocessor, microcontroller, application specific integrated circuit (ASIC), discrete logic, or a combination of circuits and/or logic. Further, although selected aspects, features, or components of the implementations are depicted as hardware or software, all or part of the systems and methods consistent with the feed forward system may be stored on, distributed across, or read from machine-readable media, for example, secondary storage devices such as hard disks, floppy disks, and CD-ROMs; a signal received from a network; or other forms of ROM or RAM either currently known or later developed. Any act or combination of acts may be stored as instructions in computer readable storage medium. Memories may be DRAM, SRAM, Flash or any other type of memory. Programs may be parts of a single program, separate programs, or distributed across several memories and processors.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs and rule sets may be parts of a single program or rule set, separate programs or rule sets, or distributed across several memories and processors.

It is intended that the foregoing detailed description be understood as an illustration of selected forms that the invention can take and not as a definition of the invention. It is only the following claims, including all equivalents, that are intended to define the scope of this invention.

The invention claimed is:

1. A feed forward control system for controlling a mechanical system, the feed forward control system comprising:
   an input device configured to receive a desired response of the mechanical system; and
   a trainable system configured for initial training based on a plurality of measured responses of the mechanical system, wherein the trainable system, after being initially trained based on the plurality of measured responses, is configured to:
      receive the desired response from the input device; and
      in response to receipt of the desired response, generate a feed forward signal that drives the mechanical system, the feed forward signal being generated to produce an actual response of the mechanical system that matches the desired response received by the trainable system;
   a comparator configured to:
      receive the desired response from the input device and the actual response of the mechanical system; and
      generate an error signal based on a difference between the desired response and the actual response; and
   a feedback device configured to:
      receive the error signal from the comparator; and
      generate a feedback signal based on the error signal, wherein the feedback signal comprises a sum of a plurality of weighted adjustment values, wherein the trainable system is further configured to:
      receive the error signal from the comparator and the feedback signal from the feedback device; and
      adjust the feed forward signal based on the error signal and the feedback signal to generate an adjusted feed forward signal that drives the mechanical system.

2. The feed forward control system of claim 1, wherein the input device comprises a first delay device configured to delay transmission of the desired response to the trainable system, where the delay provided by the first delay device is programmable.

3. The feed forward control system of claim 2, wherein the feed forward signal is further transmitted to a second delay device, the second delay device configured to delay the feed forward signal and to transmit the delayed feed forward signal to the trainable system.

4. The feed forward control system of claim 1, further comprising:
   a summer device configured to generate an applied control signal, the applied control signal to be applied to the mechanical system based on the feed forward signal and the feedback signal,
   wherein a contribution of the feed forward signal to the applied control signal is greater than a contribution of the feedback signal.

5. The feed forward control system of claim 1, wherein the comparator is configured to determine the difference based on a comparison between the actual response of the mechanical system to the applied control signal and the desired response.

6. The feed forward control system of claim 1, wherein the trainable system is further trained with a plurality of controls signals applied to the mechanical system, each control signal of the plurality of control signals associated with a respective measured response of the plurality of measured responses.

7. The feed forward control system of claim 6, wherein the trainable system is further configured to generate the feed forward signal based on a control signal associated with one of the plurality of measured responses.

8. The feed forward control system of claim 6, wherein the plurality of control signals is indicative of a subset of a range of operation of the mechanical system.

9. The feed forward control system of claim 8, wherein the trainable system is further configured to identify a control signal not among the plurality of control signals, the control signal associated with a second desired response that fails to substantially match a measured response of the plurality of measured responses.

10. A feed forward control method for use with a mechanical system, the method comprising:
    receiving, with an input device, a desired response of the mechanical system;
    after a trainable system is trained based on a plurality of measured responses of the mechanical system:
       receiving, with the trainable system, the desired response from the input device; and
       in response to receiving the desired response, generating, with the trainable system, a feed forward signal that drives the mechanical system, the feed forward signal being generated to produce an actual response of the mechanical system that matches the desired response received by the trainable system;
    receiving, with a comparator, the desired response from the input device and the actual response of the mechanical system;
    generating, with the comparator, an error signal based on a difference between the desired response and the actual response;
    generating, with a feedback device, a feedback signal based on the error signal received from the comparator, wherein the feedback signal comprises a sum of a plurality of weighted adjustment values;
    receiving, with the trainable system, the error signal from the comparator and the feedback signal from the feedback device; and
    generating, with the trainable system, an adjusted feed forward signal that drives the mechanical system by adjusting the feed forward signal based on the error signal and the feedback signal.

11. The method of claim 10, further comprising delaying transmission of the desired response to the trainable system, where the delay is programmable.

12. The method of claim 11, further comprising delaying the feed forward signal and transmitting the delayed feed forward signal to the trainable system.

13. The method of claim 10, further comprising:
generating, with a summer, an applied control signal applied to the mechanical system based on the feed forward signal and the feedback signal,
wherein a contribution of the feed forward signal to the applied control signal is greater than a contribution of the feedback signal.

14. The method of claim 10, further comprising determining, with the comparator, the difference based on a comparison between the actual response of the mechanical system to the applied control signal and the desired response.

15. The method of claim 10, wherein the trainable system is further trained with a plurality of controls signals applied to the mechanical system, each control signal of the plurality of control signals associated with a respective measured response of the plurality of measured responses.

16. The method of claim 15, further comprising generating the feed forward signal based on a control signal associated with one of the plurality of measured responses.

17. The method of claim 15, wherein the plurality of control signals is indicative of a subset of a range of operation of the mechanical system.

18. The method of claim 17, further comprising identifying a control signal not among the plurality of control signals, the control signal associated with a second desired response that fails to substantially match a measured response of the plurality of measured responses.

* * * * *